(12) United States Patent
Colemon

(10) Patent No.: US 7,272,211 B2
(45) Date of Patent: Sep. 18, 2007

(54) PROPERTY MANAGEMENT SYSTEM PROTOCOL AUTO-DETECTION

(75) Inventor: James M. Colemon, Buffalo, NY (US)

(73) Assignee: Intel Corporation, Santa Clara, CA (US)

( * ) Notice: Subject to any disclaimer, the term of this patent is extended or adjusted under 35 U.S.C. 154(b) by 956 days.

(21) Appl. No.: 10/038,917

(22) Filed: Jan. 3, 2002

(65) Prior Publication Data

US 2003/0123624 A1 Jul. 3, 2003

(51) Int. Cl.
*H04M 1/64* (2006.01)
(52) U.S. Cl. ............... 379/88.17; 379/93.13; 379/114.12; 370/352; 709/245; 712/227
(58) Field of Classification Search ........... 370/466, 370/469, 254, 352, 395.7; 379/142.14, 93.13, 379/88.17, 114.12; 235/375; 709/245; 710/129; 712/227; 715/771
See application file for complete search history.

(56) References Cited

U.S. PATENT DOCUMENTS

| | | | |
|---|---|---|---|
| 4,733,391 A * | 3/1988 | Godbold et al. ............ 370/254 |
| 5,651,058 A * | 7/1997 | Hackett-Jones et al. . 379/93.13 |
| 6,240,095 B1 * | 5/2001 | Good et al. ................. 370/412 |
| 6,603,488 B2 * | 8/2003 | Humpleman et al. ....... 715/771 |
| 6,625,168 B1 * | 9/2003 | Langer et al. ............... 370/466 |
| 6,728,251 B1 * | 4/2004 | Blanc et al. ............. 370/395.7 |
| 6,775,763 B2 * | 8/2004 | Sexton et al. ............... 712/227 |
| 6,879,583 B2 * | 4/2005 | Hoffmann ................... 370/352 |
| 6,912,277 B1 * | 6/2005 | Mashinsky et al. .... 379/114.12 |
| 7,051,116 B1 * | 5/2006 | Rodriguez-Val et al. .... 709/245 |
| 2001/0025330 A1 * | 9/2001 | Ol et al. ...................... 710/129 |
| 2002/0000464 A1 * | 1/2002 | Ramberg et al. ............ 235/375 |

* cited by examiner

*Primary Examiner*—Gerald Gauthier
(74) *Attorney, Agent, or Firm*—Grossman, Tucker, Perreault, & Pfleger, PLLC

(57) ABSTRACT

The present invention allows a messaging system such as a voice mail system to determine if it is connected to a property management system or some other device. If it is coupled to a property management system, the present invention allows the messaging system to determine which, if any, of several known protocols to use for communication all without the intervention of a user or administrator. In one embodiment, the invention includes determining whether a device is connected to a communications port of a messaging system, receiving a data packet at the communications port, determining a communications protocol for the received packet, and analyzing the received packet data structure. The invention further includes comparing the received packet data structure with a data structure for a known device, and if the data structure of the packet matches that for the known device determining the device coupled to the communications port to be a known device.

10 Claims, 3 Drawing Sheets

PROPERTY MANAGEMENT SYSTEM PROTOCOL AUTO-DETECTION

FIELD OF THE INVENTION

The present invention relates to the field of integrating a voice mail system into a property management system of the type typically used in the hospitality or lodging industry. More particularly, the invention relates to automatically detecting a protocol of one from among a number of different devices, including a property management system.

BACKGROUND

A property management system is typically used within the hospitality industry, among others, to keep track of guests, available rooms, billing, special services, reservations and a large number of other aspects of the business. In, for example a hotel, the property management system might be used to track reservations, to check guests into and out of rooms, to track use of hotel services and to generate a bill upon the end of the stay. Recently, property management systems have been connected to telephone messaging systems, such as automated attendants, unified messaging systems and voice mail systems. This can allow voice mail boxes, fax numbers, e-mail address, direct inward dial (DID) lines and other messaging services to be linked to individual rooms and guests automatically. For example, when a guest checks in, a voice mailbox resource can automatically be assigned to the appropriate room, with a default greeting. If the guest is transferred from another room, the voice mailbox can be transferred to the room as well. Personal guest profiles have been proposed which would allow a greeting and various preferences to automatically be assigned to a guest voice mailbox and to the messaging services when the guest checks in. A variety of other services and features may also be provided.

A property management system and a voice mail system typically communicate with each other through external wired interfaces, for example a serial port based on the RS-232 standard (Recommended Standard 232 promulgated by the Electrical Industries Association). Such an interface can be operated using a variety of different communications parameters. In addition, current property management systems use different incompatible communications protocols. As a result, a messaging system cannot communicate with any one particular property management system unless and until it is configured to operate using the appropriate parameters and protocols. The requirement for configuration adds to the expense of procurement, installation and maintenance.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

A property management system (PMS) is normally used by hospitality industry management, administrators and front desk staff to manage rooms and other services that are provided to the guests. There are currently a number of different PMS protocols that are used to synchronize the processing of the PMS with the messaging system to provide, e.g. the front desk operator, with a simple, integrated way to manage telephone and other communications resources together with room resources for the guests.

The present invention can exist as software modules that run with a messaging system and that can transparently interface to a number of different standard PMS protocols and protocols for other devices without requiring explicit configuration of the messaging system. The interface between the messaging system and the PMS is commonly an RS-232 serial port, however, the invention can be applied to other types of connections. The present invention can vary serial port communications parameter settings, scan the serial port data received by the messaging system from the PMS and automatically differentiate between various different PMS protocols as well as protocols from other devices. This eliminates the requirement for manual configuration. It also allows a serial port to be shared with several different devices.

Figure 1:
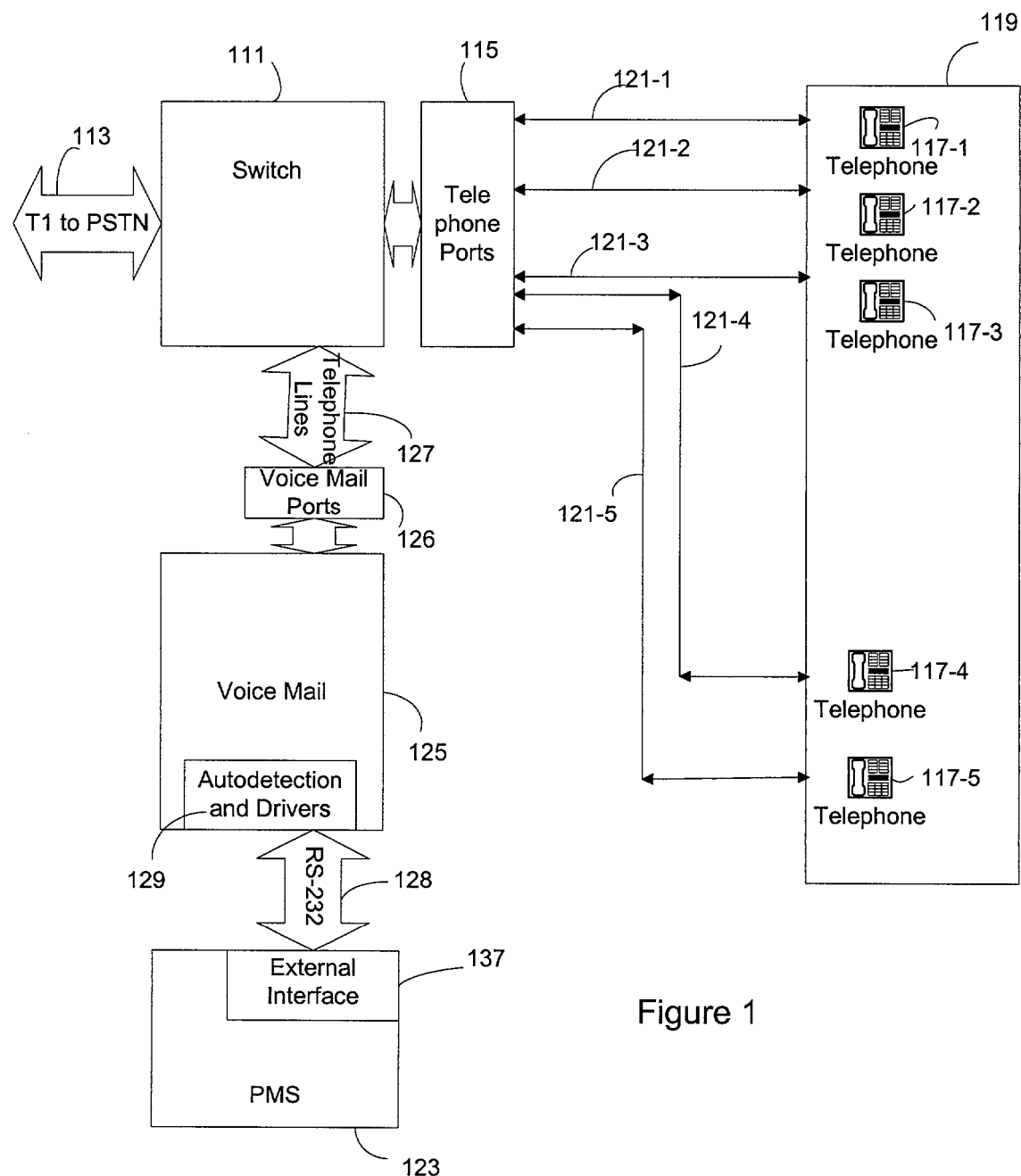
FIG. 1 is a block diagram of a switch, a voice mail system and a property management system suitable for implementing the present invention.

FIG. 1 shows a conventional switch 111 such as a PBX (private branch exchange) or a KSU (key switching unit). The switch has an interface 113 to connect to the PSTN (Public Switched Telephone Network) such as a T1 connection to a CO (Central Office). The switch also has a set of telephone ports 115 which connect to individual subscriber telephones 117-1, 117-2, 117-3, 117-4 and 117-5 within a hospitality property 119. While only 5 individual telephones are shown in FIG. 1, there can be any number of telephones and any number of room or meeting resources. The hospitality property can be any facility that uses a PMS or similar type of flexible resource allocation system. Currently hotels and resorts are the primary users. In addition, the switch can also connect to computer modem lines, Ethernet routers, video ports or any other type of communications interface.

The telephone ports are connected to each telephone through a twisted pair wired telephone line 121-1, 121-2, 121-3, 121-4 and 121-5. However, a twisted pair connection is not required for the present invention, nor is a wired system. The telephone ports 115 may also be wireless ports which connect to mobile PCU's (Personal Communication Units) allocated to various subscribers. Similarly, the connection 113 to the PSTN may be a connection to a cellular or a radio telephone system using directional or omni-directional antennas. It may also be a connection through some other type of wide area network such as the Internet or a satellite communications system. The nature of the connection to the PSTN and the nature of the connection to each individual telephone is not important to the present invention.

On the subscriber side of the switch, each individual telephone, computer modem, video conferencing center or other communications node 117, can be assigned a particular internal extension number, a particular room where the node is located, and a particular guest or group of guests that is authorized to use the resource. As mentioned above, these numbers may correspond to a particular wire connected to a telephone port at one end and to a telephone wall jack at another end or these internal numbers may be virtual extension numbers that are used to assign access to users in a less tangible way. So, for example, with multiple users, each carrying PCU's, the channels assigned to each user may be virtual channels which correspond to frequencies, timeslots or codes that are dynamically allocated based on system usage. In this case, the internal extension number does not correspond to any fixed allocation of resources, but instead serves as an identification number for a particular communication unit. The details of internal extension numbers, external telephone numbers and users and tenants are all stored in tables maintained at the switch.

In addition, users of this system can be served by a messaging system, such as a voice mail system 125. While a voice mail system is shown and described herein, an automated attendant system, answering system, unified messaging system or any other type of system that automatically answers and handles calls or administers communications resources may also be used as an addition or an alternative. The same operations, connections and components apply equally to each. The voice mail system, or other messaging system answering system is coupled to the switch through a number of telephone lines 127 which connect to ports, such as voice mail ports 126. The voice mail ports are typically carried on the voice mail system 125.

FIG. 1 also shows a property management system (PMS) 123. The PMS operates as described above to inventory and track resources of the user. There are many different types of PMS available to the hospitality or lodging industry offering different combinations of features and capabilities. Typically, they include an external interface 137 that operates on one of a variety of different PMS protocols. The external interface will also be set up to operate using a particular set of communications parameters, such as baud rate, parity, and start and stop bits. The voice mail system is coupled to this PMS interface through a connector 128 shown in FIG. 1 as an RS-232 serial connector. This connector is coupled to interface ports both in the PMS and in the voice mail system. At the voice mail system, a module of auto-detection and drivers 129 is configured to access the serial connection.

While the present embodiment shows a special separate RS-232 connector, the particular protocol and methodology used for communications between the PMS and the voice mail system depends on the built-in protocols and architecture of the PMS and the voice mail system and not on the present invention. Any number of other signaling or control channel data paths can be used on either the PMS, system bus, or on peripheral cards including Ethernet, IP (Internet Protocol), USB (Universal Serial Bus), or parallel connectors. In other scenarios, various kinds of infra-red, radio or wireless type communications can be used between the PMS and the voice mail system. In a software environment, the signaling can be done by any of a number of different types of calls, requests or sub-routines including API's (Application Programming Interface), RPCs (remote procedure calls), etc.

The hardware system for the switch and voice mail of FIG. 1 is conventional. In one configuration, the switch consists of an equipment rack with a large number of separate cards. Some cards handle groups of telephone ports as an interface to the wired internal extension network. Other cards carry telephone ports as an external interface to, for example, a T1 line or a voice over IP network. Some cards carry switching circuits between the various ports. Still further cards handle network management and administration. Other cards can carry interfaces for digital signaling such as RS-232, Ethernet etc. The cards are typically coupled together through a backplane which can be built into the equipment rack or the cards may use electrical or optical connectors coupling together the cards and the system. In some configurations, each telephone line has an analog connection and a digital connection through the backplane. The digital connection includes administration and log data, as well as identification information for each active telephone connection.

Similarly, the voice mail system can be constructed using a variety of hardware or software configurations well known in the art. In one configuration, the voice mail system is based on a conventional microcomputer architecture using a single central processor, a hard drive memory storage for messages and configuration tables, and adapter cards coupled to a shared communications bus to receive telephone lines and constitute the voice mail ports shown in FIG. 1. Such a microcomputer architecture allows for a large variety of different communications interfaces including the RS-232 connector shown in FIG. 1. Higher bandwidth communications can be routed through token key network connections or Ethernet connections, for example, as well as through a variety of other digital and analog communications protocols.

In another configuration, the voice mail system is constructed as a separate card which plugs into the equipment rack occupied by the switch. The voice mail card connects to the same backplane as the cards of the switch. In this case, the voice mail ports can offer a connection similar to that offered by the telephone ports and can be coupled to the switching architecture using electrical or optical lines or directly through the backplane. In another configuration, the voice mail system can exist as independent software modules running directly on the switch central processing unit or some other part of the switch hardware architecture.

The Property Management System is typically a part of a microcomputer network that connects with terminals at the front desk and in the business offices of the property. The PMS can be constructed using a variety of hardware or software configurations well known in the art. In one configuration, the PMS, like the voice mail system is based on a conventional microcomputer architecture using a single central processor, a hard drive memory storage for messages and configuration tables, and adapter cards coupled to a shared communications bus to communicate with other computers in the system. Such a microcomputer architecture allows for a large variety of different communications interfaces including the RS-232 connector shown in FIG. 1. Higher bandwidth communications can be routed through token key network connections or Ethernet connections, for example, as well as through a variety of other digital and analog communications protocols. The PMS can also exist as independent software modules running directly on the voice mail system or some other part of the computer network architecture.

Figure 2A:
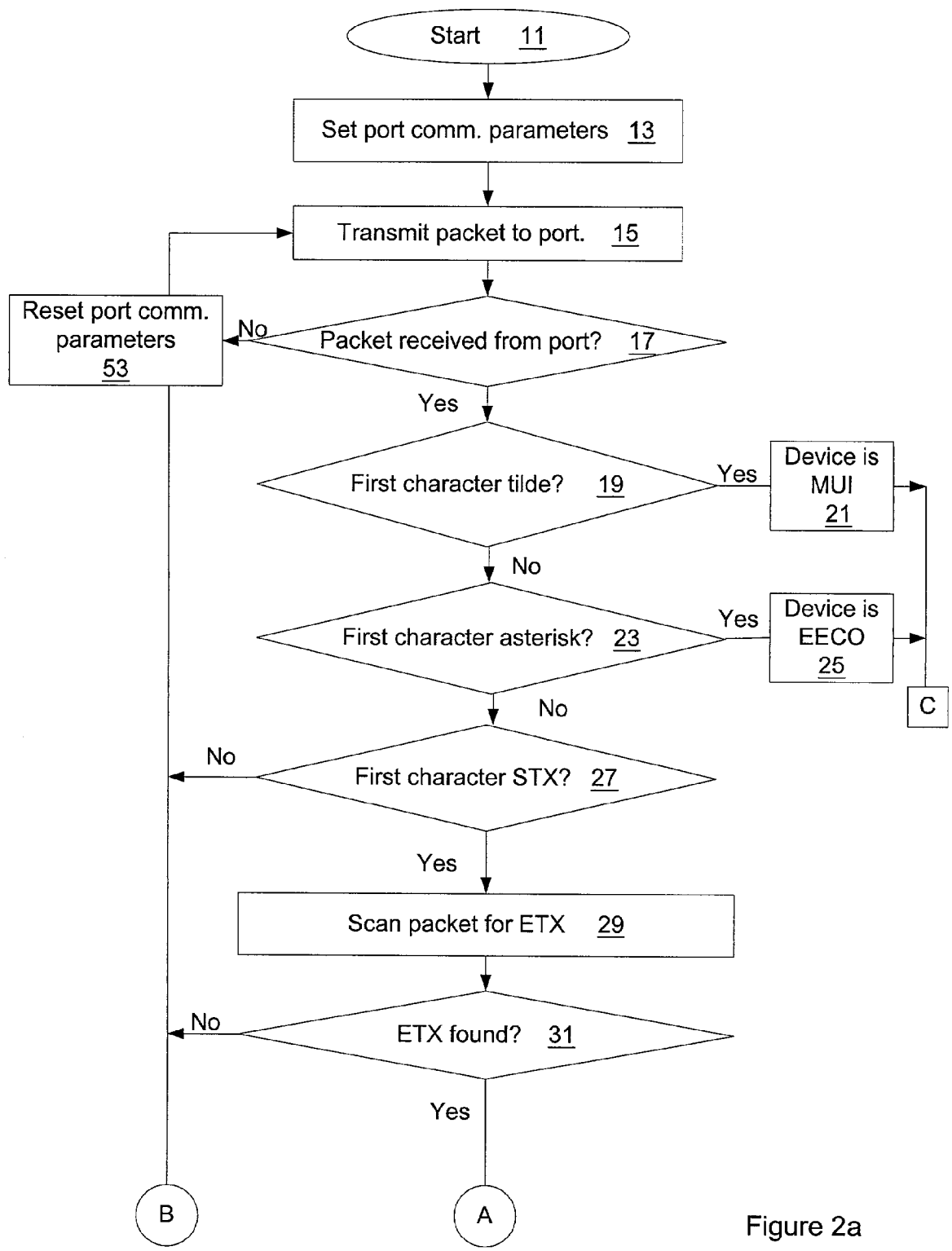
FIG. 2 is a flow diagram of an auto-detection process according to one embodiment of the present invention.
Figure 2B:
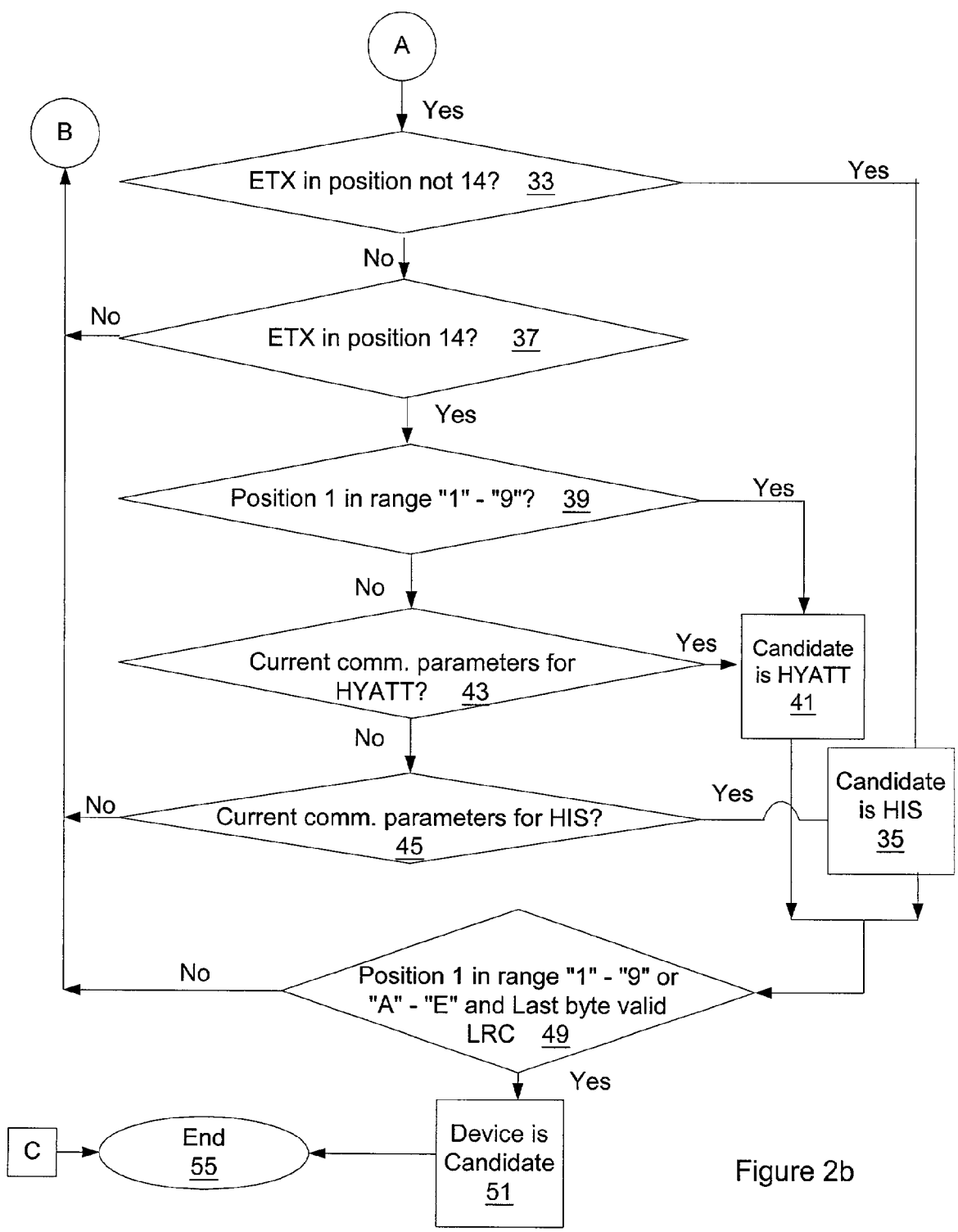

The features of the present invention can be further understood with reference to the process illustrated in FIG. 2. The process begins at Start 11 and then goes to setting communications parameters 11. The process may begin 11 on startup of the voice mail system, on a regular schedule, or after no data has been received over the port for a selected amount of time. The condition of not receiving any data can suggest that the device coupled to the port has changed, that it has been removed, or that the port is dead.

The particular parameters to set depend on the type of connection for which the auto-detection is to be performed. For an RS-232 connection, these communications parameters can include baud rate, parity type as even or odd, the location of the start and stop bits, and the number of bits in a word. With other connections, the set of communication parameters may differ. Since there are a limited number of possible devices that may be connected to the voice mail system, there is a corresponding limited number of possible communication parameter settings with which these devices communicate. In one embodiment, the voice mail system, in the auto-detection module, has a ranked list of possible devices and the communications setting for each device. The process can then begin with the most likely correct communications setting being tried first. Since a variety of baud rates may be used, the voice mail system may have to cycle through the various candidate speeds and listen for a sufficient amount of time in order to determine if there is a remote system connected.

Once a set of communications parameters are selected, the voice mail system can send a packet 15 through the external connection port. If the voice mail system has a ranked list of possible devices, then this list will also include a startup packet, polling signal, synchronization request or some other signal appropriate to send to the most likely device. The voice mail system then listens for a response 17. With most connected devices, the response will either be an expected response to the sent packet or it will be an error or negative acknowledgment signal. However, if the packet is unintelligible to the connected device, then there may be no response at all. If there is no response at all, then the communications parameters are reset 53 and another packet is sent 15 using the new parameters.

The new parameters can be selected from a list of parameters for the devices that are likely to be coupled to the voice mail system. When no packet is received, the voice mail system, through the auto-detection module can then select the next most likely device to be coupled to the port. In some cases, the problem may not be the communications parameters but the content or structure of the sent packet. Accordingly, the parameters may not be changed if there is a different packet that can be tried using the same parameters. As can be seen in FIG. 2, the system can continue to try new communications parameters and new packets until an intelligible packet is received over the port.

As an alternative to selecting parameters and sending packets, the voice mail system can instead sit quietly and listen for data transmitted to it over the port. The received data can then be analyzed using standard digital signal processing techniques to determine the baud rate, parity, packet structure and the data. This processing can be done in a deterministic way or by comparing the packet to a set of likely possibilities. The likely possibilities can be developed from a list of possible devices with which the voice mail system can communicate. If the voice mail system does not transmit a packet of some kind through the port, it may happen that the device to be auto-detected also does not transmit. It is then not possible to determine whether a device is or is not connected to the port. Accordingly, a timer can be set up, so that if no packet is received after some amount of time, for example 60 seconds, then the voice mail system can transmit a packet of some kind to induce a response. The parameters and signal can be selected using the knowledge that the device is not one that sends data without a request or synchronization signal.

Once a packet has been received 17, it can be analyzed 19. If the packet is received in response to a signal sent from the voice mail port, then it can be parsed using the selected communications setting for the sent signal. If the response cannot be understood using the same communications settings, then the packet can be rejected as most likely an error or negative acknowledgment signal. The system can reset 53 and try a different packet or different settings. If the packet is received without first sending a response, then it can be analyzed to determine its parameters. Using these parameters, the packet can be parsed and the data extracted.

The extracted data can then be compared to possible expected responses to determine the type of the sender of the packet. In one embodiment, the value of particular bytes are considered. In another embodiment, a number of possible conditional tests are applied to determine the type of device that sent the packet. The analysis of particular bytes is suggested in FIG. 2, in which it is determined whether the first character is a tilde 19, an asterisk 23 or a start-of-text character (STX) 27. In each case, the first character (position 0), i.e. the byte in position 0 of the data portion of the packet provides significant information as to the type of device that is connected to the port. The particular tests suggested in FIG. 1 at 19, 23 and 27 are appropriate for one group of possible devices, however, there are many other possibilities depending upon the devices that are likely to be connected to the port. In addition, the protocols for the devices may change over time, so that, for example, the tilde is not used, but an ampersand is, or so that the most useful position to test is not position zero but another position, for example, position 3.

In the present example, if the tilde is the first character (position 0) 19, then the packet is structured in accordance with the standards and requirements for a particular UI (user interface) device such as a management UI for system administration. The serial port is accordingly coupled to this user interface device. The auto-detection module can then declare that the device is the user interface 21, set the drivers for communication with the user interface and end the process 55. If the first character is not a tilde, then other tests can be applied. Of course, the tilde is used as an example, different devices may use protocols that require a different character in position 0.

Similarly, if the asterisk is the first character, then the device is a PMS that uses the EECO protocol (developed by EECO Computer Systems, Inc.). Since, in the present example, there is only one possible device that uses an asterisk in position 1, the auto-detection module can declare that the device is an EECO PMS 25, make the appropriate settings and end the inquiry 55.

In some applications, the process as described so far, can be sufficient to determine whether a device is connected to the port and, if so, what the device is. The present invention can run in at least two modes. One mode is a full auto-detection mode. In this mode, the voice mail system automatically determines the difference between the UI manager protocol and all of the PMS protocols. In this mode, the voice mail can be installed and the PMS installed or modified or exchanged and no configuration is necessary. It is possible to temporarily disconnect the PMS, connect the UI, then return to any PMS. While only one PMS, EECO, has been detected in the process above, using the process as described so far, the system can distinguish between the UI, EECO, and a default PMS. Distinguishing other PMS's is described in more detail below.

While the UI packet of the present example begins with a tilde character ("~"), many of the PMS protocols currently in use start with an STX control character, and the EECO protocol starts with an asterisk "*" character. Accordingly, it is possible to determine if the remote system is the UI manager or a PMS system just from the first character. The EECO PMS system is identified by a polling signal, as it is silent until it is polled.

This mode can be referred to as partial auto-detection. Even if different PMS's are not distinguished, using only the steps described above, it is possible to determine whether it is the UI or PMS that is connected. In this mode, some configuration can be made through the UI. This configuration can specify which PMS protocol is to be used as the default and set up its parameters. This specification can be changed when the PMS system is changed. The partial auto-detection eliminates the need for any special procedure to switch between UI and configured PMS. Note that the last step of checking for an asterisk in position 0 is not necessary in order to distinguish the UI from the PMS. After checking for a tilde, the system can declare that the device is either the UI or the PMS without also confirming by checking for the asterisk. Conversely, the asterisk or any other relevant character can be checked instead of the tilde.

As can be seen from FIG. 2, the situation is greatly simplified if the voicemail manager first configures the system to indicate the type of PMS system that is to be connected to the communications port. The partial auto-detection mode is very useful in part because, in some applications, the PMS type will rarely, if ever, change once it is configured and operating. With this configuration specified, the process can be reduced to determining if it is the UI or the PMS that is communicating with the voice mail system through the port. As described above, this is rather simple, only requiring, for example, a check of the first character (position 0) of a packet. Baud rate determination can also be simplified, as most protocols specify a specific baud rate. Baud rate detection can be eliminated by also manually configuring the PMS serial port settings. Configuring the PMS type also allows the accommodation of PMS's that do not send data without first receiving a polling signal, such as EECO. If EECO were the configured PMS protocol, the voicemail system can poll the PMS on occasion e.g. once per minute. If there were no response as specified in the protocol, the voicemail system can assume the PMS link is down and use the remainder of the minute to listen for a connection from the UI.

As mentioned above, the voice mail system can begin without sending a startup or synchronization packet, but by analyzing received data from the port. Since a variety of baud rates may be used by the protocols of different PMS systems, all the potential baud rates can be scanned until data can be resolved. Then the data can be checked against the various protocols to see if there is a match. For the test of the character in position 0 mentioned above, a simple way to obtain the appropriate packet is to wait for a short period of silence that is followed by data. The first character after the silence is then very likely to be the start of a packet. If that character is a tilde, the remote system is the UI. If that first character is an STX control character 27, the remote system is a PMS, as will be described in more detail below. In either case the rest of the packet can then be verified to determine if it is valid for the selected protocol. In the case of a PMS system, various packet attributes can be verified in order to determine which specific PMS protocol is in use, as described below.

Scanning for data at several different baud rates can be time consuming, if the system lingers at each baud rate long enough to determine whether the received signals can be resolved. This lingering time can be chosen to yield a sufficiently high probability of detecting data during the dwell, without causing the overall search cycle to become excessively long.

A one minute dwell time has been found to be sufficient without overly hampering system operations. If, after one minute has passed, no data has been received, then an attempt to poll the PMS can be made. Under some protocols, for example EECO, data is sent only in response to a poll or request. If there is a response to the poll, the resultant packet can be verified to determine if it is valid, for example, by looking for an asterisk character. If some other system is connected, other than an EECO protocol PMS, then it is likely to give an error response or no response to occasionally receiving an EECO poll from the voice mail system.

Even with carefully constructed conditional logic, it can be difficult, due to the ambiguous structure of the different PMS packets to distinguish protocols that are similar. Many PMS packets send strings of ASCII (American Standard Code for Information Interchange) characters that start with an STX character (e.g. ASCII 0x02) followed by a series of ASCII data characters, an ETX character (e.g. ASCII 0x03), and finally an error detection byte. There are no delimiters within the packets. Without knowing the fields, it can be difficult to determine the meaning and expected structure of a packet, making it difficult to dynamically determine the protocol that is in use. The automatic detection logic can work more quickly by remembering the last used PMS protocol. In many field installations, it is highly likely that if a PMS link goes down, it will still be the same type of PMS when the link comes back up. Therefore, by giving priority to detecting either the UI protocol, or the last used PMS protocol, the auto detection protocol can spend less time looking for other PMS protocols.

Referring to FIG. 2, these PMS protocols can be distinguished by first finding the STX (start) character in position 0 (first character). If the character is there 27, then the packet is scanned for the ETX (end) character 31. If there is no STX, then the packet is not from a PMS, the parameters are reset 53 and another attempt is made 15. Similarly, if there is no ETX, then the parameters are reset 53 and another startup packet is sent 15.

Having found both the STX 27 and the ETX 31, conditional logic tests can be applied to determine which of the possible PMS's is connected to the port. In the example of FIG. 2, a simple flow chart with branch instructions is used, however, the conditional logic can be rendered in any form depending on the preferences for the particular application. Similarly the particular conditions and branches are selected to distinguish between two possible common PMS protocols, Encore (developed by Encore Systems, Inc.) and HIS (developed by Hotel Information Systems division of MAI Systems Corp. for use in its Paragon PMS). Some other protocols work similarly or almost identically. In addition, the conditional logic can be expanded or modified to distinguish between other or additional PMS protocols. The branch instructions described below are intended only as an example.

To distinguish between Encore and HIS, the position of the ETX character is analyzed 33, 37. If 33 the ETX character is in a position other than 14, then it is likely that the PMS protocol is HIS. HIS is declared to be the candidate PMS protocol 35 and this candidate is then tested further. Two tests are then applied 49. The character in position 1 is analyzed to determine if it is within the range of "1"-"9" or "A"-"E" and whether the last byte of the packet is a valid LRC (longitudinal redundancy check) 49. The position 1 test is an analysis of the ASCII character for that position. The character must be either 0x31-0x39 or 0x41-0x46. The LRC test can be done by calculating the LRC for the packet and then comparing the result with the last byte of the packet. If both tests are positive, then the candidate of HIS is confirmed to be correct 51 and the process ends 55. The voice mail system can then set itself for the HIS protocol and communications proceed accordingly.

If 37 the ETX character is in position 14, a different set of tests are applied. If the ETX character is not in position 14 and, as already checked 33, not in any other position then new parameters are selected 53 and a new polling signal is sent 15. With the ETX character in position 14, position 1 is checked 39 for a character in the range of "1" to "9". If the character in position 1 falls within this range then Encore is declared to the candidate PMS 41. With Encore as the candidate, the last byte of the packet is analyzed. If it is a valid LRC 49, then Encore is confirmed 51 as the device coupled to the port and the process ends 55. The voice mail system can then set itself for, the Encore protocol and communications proceed accordingly. If the position 1 character is not in this range, then the voice mail system looks at defaults.

As mentioned above, the use of defaults can make the determination process simpler. As an alternative to the sequence described above, the voice mail system can apply the defaults first. If the defaults do not check out, then the tests of the ETX character and of position 1 can be used. The voice mail system can have a default that is set upon installation or configuration, for example through the UI manager. It can also use the last connected PMS device as the default.

Another indication of the PMS that can be employed is the communication parameters that are being used for the communications port to the unknown device. PMS systems typically have a preferred set of communication parameters even if some parameters such as baud rate may be permissible within a range. The auto-detection module of the voice mail system can use the current communications parameters settings to determine a PMS candidate. If the communication parameters correspond to the Encore PMS protocol 45, then Encore can be declared to be the candidate PMS protocol 41 and the candidate can be tested 49 as before by checking the position 1 character and the LRC byte. Similarly, if the communications parameters correspond to HIS 45, then HIS can be determined to be the candidate 35 and the candidate can be tested 49. In either event, if the candidate is confirmed 51, the process can end 55 with the voice mail system being configured as appropriate.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 1, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/ machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a voice mail system working with a property management system, it can be applied to a wide variety of shared voice mail or generic messaging systems in which identification information can be exchanged. Such systems include voice over IP, data switched and router based systems. The telephone calls may include voice, video, music, broadcast and data calls. The PMS can operate for hotels, hospitals, apartments, common carriers and public transportation vehicles and can include myriad functions beyond voice mail and telephone options management. The present invention can be applied to fixed telephone terminals as well as to low and high mobility voice and data terminals. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

The invention claimed is:

1. An apparatus comprising:
  a communications port of a messaging system for sending and receiving packets between the messaging system and a connected property management device;
  means for determining a communications parameter set for a packet received from a property management device connected to the communications port;
  means for analyzing the received packet data structure;
  means for comparing the received packet data structure with a data structure for a known type of device; and
  means for determining if the device coupled to the communications port is a known property management device by determining if the data structure of the packet matches that for the known type of property management device.

2. The apparatus of claim 1, wherein the means for determining whether a property management device is connected comprises means for checking for data received at the communications port.

3. The apparatus of claim 1, wherein the means for determining whether a property management device is connected comprises means for sending a signal through the communications port and means for checking for a response.

4. The apparatus of claim 1, wherein the means for determining a communications parameter set comprises means for applying a variety of baud rate and parity setting to the packet and selecting a baud rate and parity combination that is consistent with the packet.

5. The apparatus of claim 1, wherein the means for comparing comprises a series of conditional branch instructions for determining a matching known type of property management device.

6. The apparatus of claim 1 wherein the messaging system is a voice mail system.

7. A messaging system comprising:
  a communications port for sending and receiving packets between the messaging system and a connected property management device;

a memory to store a set of data structures of known types of property management devices; and a processor coupled to the port and the memory to analyze the data structure of a packet received at the communications port from a device connected to the communications port, to compare the received packet data structure with the stored known data structures, and to determine that the property management device coupled to the communications port is a known type of property management device if the data structure of the received packet matches the data structure for the known type of property management device.

8. The system of claim 7, wherein the memory further stores communications parameter sets and wherein the processor applies a variety of baud rate and parity setting to the packet to select a baud rate and parity combination that is consistent with the packet.

9. The system of claim 8, wherein the processor compares the value of a byte and the selected baud rate and parity combination to stored combinations of values for known types of property management devices.

10. The system of claim 7, wherein the processor executes a series of conditional branch instructions for determining a matching known types of property management device.

* * * * *